United States Patent
Johansson et al.

(10) Patent No.: US 7,544,008 B2
(45) Date of Patent: Jun. 9, 2009

(54) FLANGE DRESSING AND METHOD FOR ATTACHING A GAS SPRING

(75) Inventors: Mårten Johansson, Mjölby (SE); Leif Lundahl, Nöbbele (SE); Per Nordvall, Tranås (SE); Zoltan Pap, Tranås (SE); Marcus Cronholm, Mjölby (SE)

(73) Assignee: Stromsholmen AB, Tranas (SE)

( * ) Notice: Subject to any disclaimer, the term of this patent is extended or adjusted under 35 U.S.C. 154(b) by 340 days.

(21) Appl. No.: 10/535,456

(22) PCT Filed: Oct. 24, 2003

(86) PCT No.: PCT/SE03/01646

§ 371 (c)(1),
(2), (4) Date: May 19, 2005

(87) PCT Pub. No.: WO2004/048802

PCT Pub. Date: Jun. 10, 2004

(65) Prior Publication Data

US 2006/0045614 A1    Mar. 2, 2006

(30) Foreign Application Priority Data

Nov. 28, 2002  (SE) .................................. 0203539

(51) Int. Cl.
    *F16D 1/033* (2006.01)
(52) U.S. Cl. ................. 403/337; 403/336; 403/338; 403/369; 403/370; 403/374.4
(58) Field of Classification Search ................. 403/336, 403/337, 338, 367, 368, 369, 370, 374.1, 403/374.2, 374.3, 374.4; 92/128; 29/888.044; 285/339, 341, 336, 194, 204, 207, 333
See application file for complete search history.

(56) References Cited

U.S. PATENT DOCUMENTS

| | | | | | |
|---|---|---|---|---|---|
| 2,868,576 | A | * | 1/1959 | Boughton | 403/336 |
| 3,652,110 | A | * | 3/1972 | Manton | 403/336 |
| 3,687,494 | A | * | 8/1972 | Graff | 285/341 |
| 3,695,640 | A | * | 10/1972 | Clague | 285/341 |
| 5,145,277 | A | * | 9/1992 | Fujita et al. | 403/374.4 |
| 6,371,530 | B1 | * | 4/2002 | Sato et al. | 285/337 |
| 2001/0038771 | A1 | | 11/2001 | Wirth et al. | |

FOREIGN PATENT DOCUMENTS

| | | |
|---|---|---|
| FR | 2695974 A1 | 3/1994 |
| JP | 2000274566 A | 10/2000 |
| WO | WO 0242015 A1 | 5/2002 |

* cited by examiner

*Primary Examiner*—Michael P Ferguson
(74) *Attorney, Agent, or Firm*—Fay Sharpe LLP; Brian E. Turung

(57) ABSTRACT

A flanged connection and a method of fixing a gas-filled spring in a machine tool. The flanged connection includes an upper flange half and a lower flange half that can be joined together, each having a through-opening intended to receive the gas-filled spring, and a locking ring intended to secure the gas-filled spring by insertion into a groove of complementary design around the gas-filled spring and fixing between the flange halves. The locking ring is supplemented by a fixing element designed to apply a clamping force around the gas-filled spring when joining the flange halves together.

13 Claims, 5 Drawing Sheets

FLANGE DRESSING AND METHOD FOR ATTACHING A GAS SPRING

TECHNICAL FIELD

The present invention relates to a flanged connection for fixing a gas-filled spring in a machine tool wherein the flanged connection includes an upper flange half and a lower flange half, which can be joined together and which each have a through-opening intended to receive the gas-filled spring, and a locking ring intended to secure the gas-filled spring by insertion into a groove of complementary design around the gas-filled spring and intended for fixing between the flange halves, wherein the locking ring is supplemented by a fixing element designed to apply a clamping force around the gas-filled spring when joining the flange halves together.

The invention also relates to a method of fixing a gas-filled spring in a machine tool by which method an upper flange half and a lower flange half which can be joined together are fitted around the gas-filled spring and a locking ring arranged between the flange halves is fitted around the gas-filled spring in a groove of complementary design and is fixed between the flange halves securing the gas-filled spring, wherein when joining a clamping force is applied around the gas-filled spring by a fixing element supplementing the locking ring.

PRIOR ART

At present, in pressing tools intended for forming sheet metal parts gas-filled springs are mainly used for the various spring functions required. The gas-filled springs are used, for example, for securing sheet metal, returning shuttles and separating tool halves. Depending on the application, space and various design rules, different types of fixing methods and attachments are used to hold the gas-filled springs in place. Some gas-filled springs and their attachments are standardised according to ISO standard. It is required that the fixing be capable of supporting the loads resulting not only from the intrinsic force of the gas-filled spring but also inertial forces acting both within and around the gas-filled spring in order that the fixing will be reliable and functional. It is furthermore also required that the fixing be capable of withstanding the vibrations which for various reasons occur in the tools where the gas-filled springs are installed.

A particular problem currently exists with a type of flanged connection which is fixed in a C-shaped groove on the tubular body of the gas-filled spring. This type of flanged connection is normally in two pieces. A locking ring which is normally in two pieces but which can also be in one piece is used to fix the flanged connection to the spring. This locking ring is placed in the C-shaped groove on the tubular body of the gas-filled spring, following which the two flange halves are placed on either side of the locking ring. The two flange halves are then joined together so that they sit securely fixed on the gas filled spring. The gas-filled spring with its attachment are then fitted in a recess in the tool intended for this purpose where they are held in place by means of a number of assembly bolts. The flanged connection described above is shown in FIG. 1 and will be described in more detail later. This flanged connection design is well suited to absorbing the reaction forces that occur as a result of the compression of the gas-filled spring. In most cases, however, with this type of design a certain play will develop between the locking ring and the C-shaped groove on this gas-filled spring, making the design less well-suited to absorbing the load cycles caused by the mass moment of inertia of the piston rod. What often happens with the prior art is that after a certain operating time the fastening no longer sits firmly secured to the gas-filled spring and the C-shaped groove will thereby start to become deformed. This deformation of the C-shaped groove can have a negative effect on the strength of the gas-filled spring and in the worst case leads to failure of the gas-filled spring with the risk both of material damage and injury to persons.

A further negative effect is that the incorrect positioning/inclination of the gas-filled spring resulting from the deformed C-shaped groove can lead to increased wear both of the gas-filled spring and the tool in which the gas-filled spring is fitted. The fact that the gas-filled spring is no longer fully secured can also lead to problems if the gas-filled spring is connected to a hose system. Problems then arise if the gas-filled spring starts to rotate in its fastening with the result that the connection point for the hose will be shifted and the connected hose risks being damaged with the occurrence of an undesirable gas leakage. This gas leakage can in turn lead to serious damage to the tool in question and/or may mean that the parts machined in the machine tool will be of an inferior quality. In this case, too, there is some risk of injury to persons.

DESCRIPTION OF THE INVENTION

An object of the present Invention is to provide an improved flanged connection and method of fixing a gas-filled spring in a machine tool. This has been achieved by a flanged connection for fixing a gas-filled spring in a machine tool wherein the flanged connection includes an upper flange half and a lower flange half, which can be joined together and which each have a through-opening intended to receive the gas-filled spring, and a locking ring intended to secure the gas-filled spring by insertion into a groove of complementary design around the gas-filled spring and intended for fixing between the flange halves, wherein the locking ring is supplemented by a fixing element designed to apply a clamping force around the gas-filled spring when joining the flange halves together. This has also been achieved by a method of fixing a gas-filled spring in a machine tool by which method an upper flange half and a lower flange half which can be joined together are fitted around the gas-filled spring and a locking ring arranged between the flange halves is fitted around the gas-filled spring in a groove of complementary design and is fixed between the flange halves securing the gas-filled spring, wherein when joining a clamping force is applied around the gas-filled spring by a fixing element supplementing the locking ring.

According to one embodiment of the present invention the flanged connection comprises an upper and a lower flange half, which can be joined together and which each have a through-opening intended to receive the gas-filled spring, and a locking ring intended to secure the gas-filled spring by insertion into a groove of complementary design around the gas-filled spring and fixing between the flange halves, the locking ring being supplemented by a fixing element designed to apply a clamping force around the gas-filled spring when joining the flange halves together.

One advantage of the fixing element having a clamping function is that the flanged connection is more able to cope with the reaction forces and load cycles that occur when the gas-filled spring is compressed. The clamping function is less susceptible to the play which can arise between the locking ring and the C-shaped groove in the gas-filled spring, with the result that the C-shaped grove is less easily deformed since the fastening will sit more firmly secured against the gas-filled spring than in the prior art.

Another advantage of the invention is that the clamping function of the fixing element prevents rotation of the gas-filled spring, which eliminates the risk of gas leakage when the gas-filled spring is connected to a hose system.

BRIEF DESCRIPTION FO THE DRAWINGS

The invention will now be described in more detail with examples of embodiment and with reference to the drawings attached, in which.

DETAILED DESCRIPTION OF EMBODIMENTS OF THE INVENTION

Figure 1:
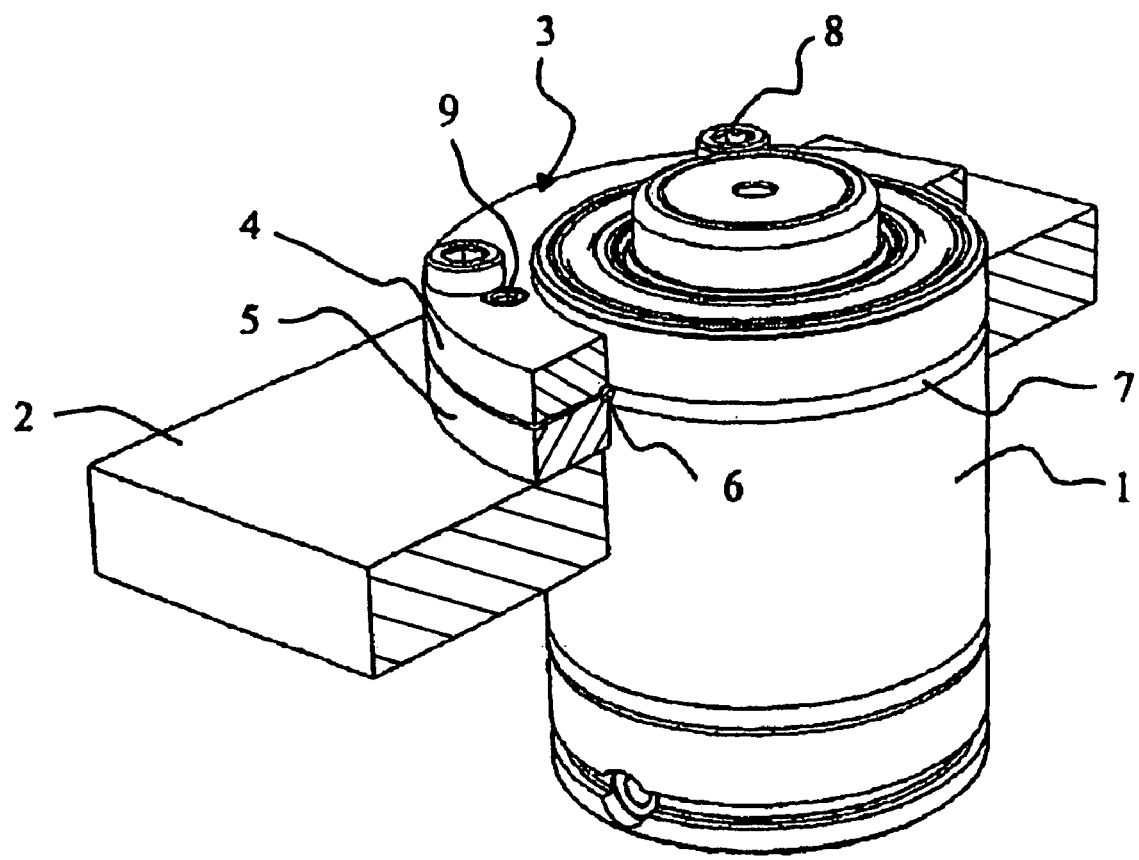
FIG. 1 shows a schematic, perspective view of a known fixing device.

FIG. 1 shows a known flanged connection 3 intended for fixing a gas-filled spring 1 in a machine tool 2. The flanged connection 3 comprises an upper flange half 4 and a lower flange half 5. Both the upper flange half 4 and the lower flange half 5 are provided with recesses designed to receive a locking ring 6. This locking ring 6 is placed in a C-shaped groove 7, intended for this purpose, on the tubular body of the gas-filled spring 1, following which the two flange halves 4, 5 are placed on either side of said locking ring 6. The two flange halves 4, 5 are then joined together by means of fixing screws 9, for example, so that they sit securely fixed to the gas-filled spring 1. The gas-filled spring 1 with its flanged connection 3 is then fitted in a recess in the tool 2, intended for this purpose, where it is held in place by means of a number of assembly bolts 8.

Figure 2:
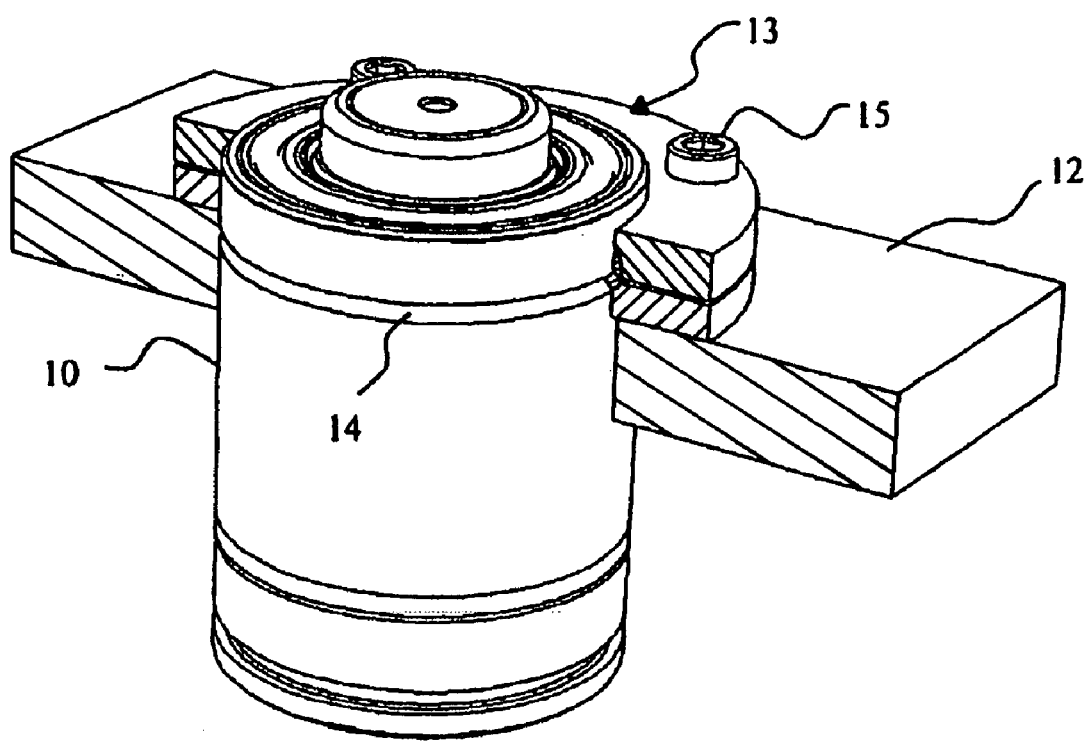
FIG. 2 shows a schematic, perspective view of a device according to the invention.

FIG. 2 shows a preferred embodiment of the present invention, in which a gas-filled spring 10 is fitted in a pressing tool 12 by means of a flanged connection 13. The flanged connection 13 is fitted in a recess in the tool 12 by means of a number of assembly bolts 15, for example four bolts. For fixing the flanged connection 13 to the gas-filled spring 10 a locking ring 18 (shown in FIG. 4) is used, which is normally in two pieces but which can also be designed in one piece. This locking ring 18 is placed in a groove 14, intended for this purpose, on the tubular body of the gas-filled spring 10, which in the preferred embodiment is a C-shaped groove 14.

Figure 3:
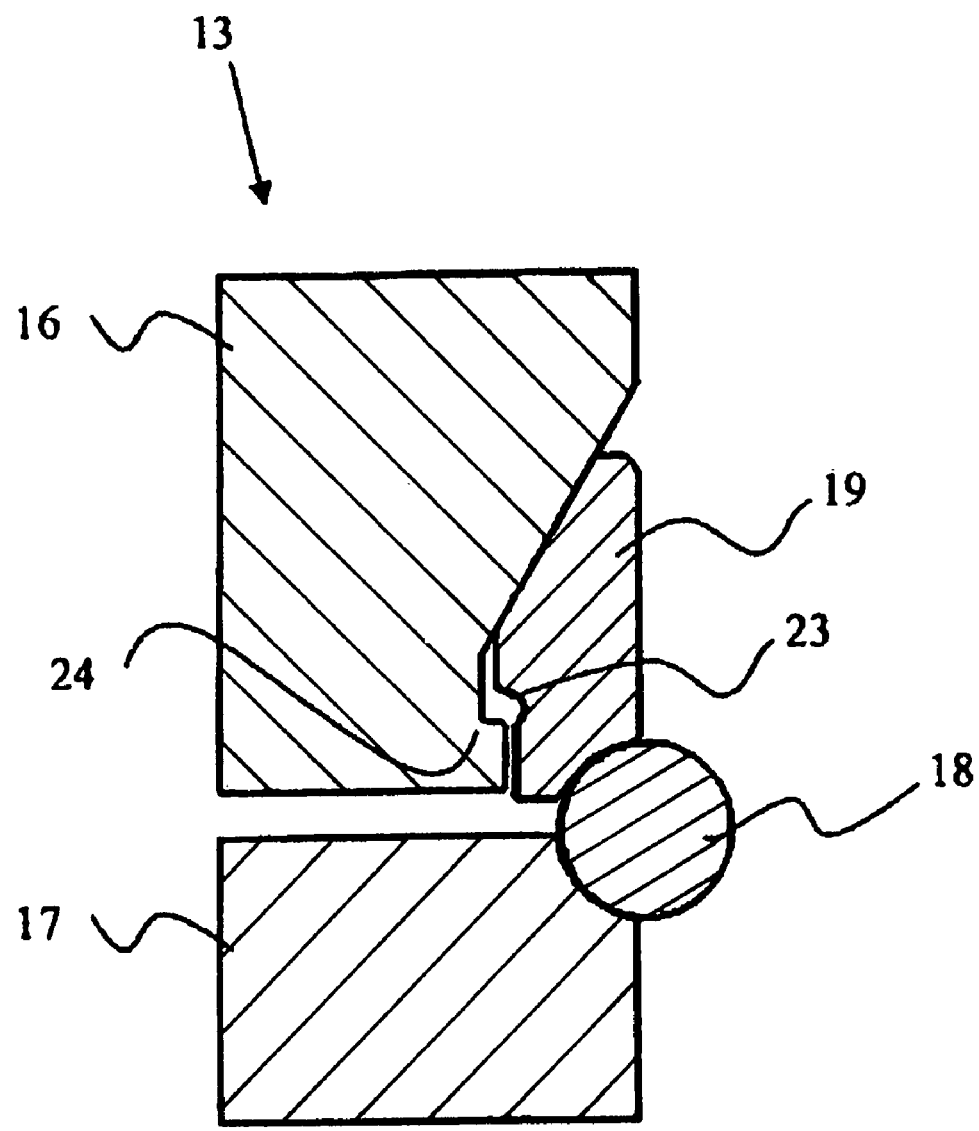
FIG. 3 shows a detailed cross-section through the device according to the invention.

FIG. 3 shows a detailed view of the flanged connection 13, which comprises an upper flange half 16 and a lower flange half 17, the locking ring 18 and a fixing element 19. The fixing element 19 is fitted between the upper flange half 16, the locking ring 18 and the gas-filled spring 10 (shown in FIG. 2). The two flange halves 16, 17 are fitted to one another by means of fixing screws 20 (shown in FIG. 4), which hold the flanged connection 13 together. In the preferred embodiment the upper flange half 16 and the fixing element 19 are designed as two complementary wedge-shaped parts. A groove 23 intended to lock in an axial direction against a projecting part 24 arranged on the upper flange half 16 runs along the outside of the fixing element 19 under the wedge-shaped part. A clamping force is produced in that the fixing element 19 permits a radial displacement/contraction. This radial displacement is created by tightening the assembly bolts 15 when fitting the flanged connection 13 in the tool 12.

Figure 4:
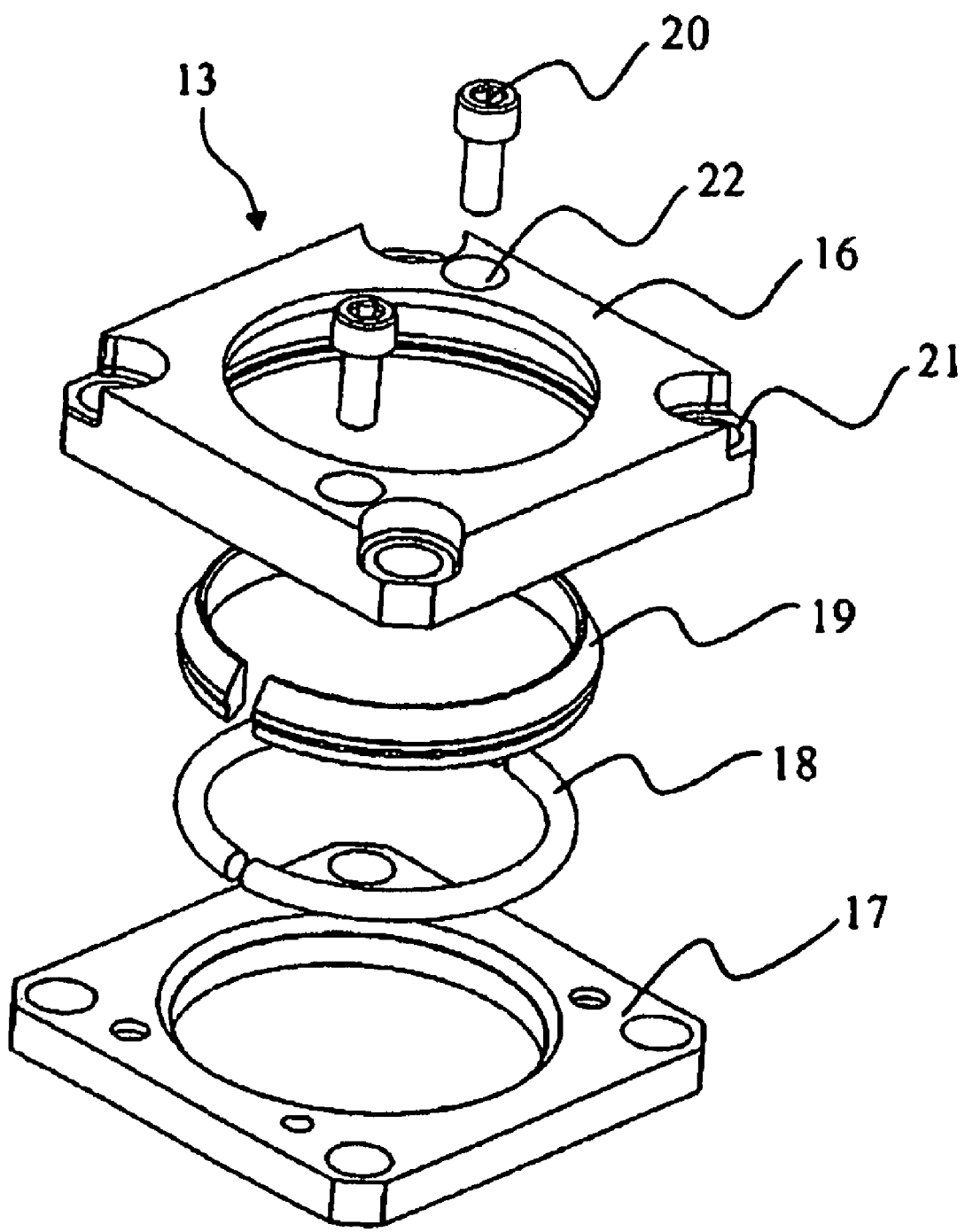
FIG. 4 shows an exploded sketch drawing of the device according to the invention.

FIG. 4 shows an exploded sketch drawing of the preferred embodiment of the present invention. Like the fixing element 19, the locking ring 18 and the lower flange half 17, the upper flange half 16 has a through-opening to receive the gas-filled spring 10. The upper flange half 16 furthermore has recesses 21 for the four assembly bolts 15, and recesses 22 for receiving the fixing screws 20. At the through-opening the upper flange half 16 is provided with a section which is inclined towards the central axis of the flanged connection 13 and which constitutes the wedge-shaped part of the upper flange half 16. The fixing element 19 accordingly has a corresponding wedge-shaped part on its outside. Along the inside of the fixing element 19 there is a slightly undersized recess (shown in FIG. 3) designed to receive the locking ring 18. In the preferred embodiment the locking ring 18 and the fixing element 19 are designed in two parts but can equally well be designed in one piece. Like the upper flange half 16, the lower flange half 17 has recesses for assembly bolts 15 and fixing screws 20 and is provided with a recess running along the inside which is designed to receive the locking ring 18.

When fitting the gas-filled spring 10 in the machine tool 12 the locking ring 18 is placed in the C-shaped groove 14 on the tubular body of the gas-filled spring 10 and the fixing element 19 is placed on top of locking ring 18 with the recess on the inside resting against the locking ring 18. The two flange halves 16, 17 are placed on either side of the locking ring 18 and the fixing element 19. The two flange halves 16, 17 are then joined together by means of fixing screws 20, for example, so that they sit securely fixed to the gas-filled spring 10. The gas-filled spring 10 with its flanged connection 13 is then fitted in a recess, intended for this purpose, in the tool 12, where it is held in place by means of a number of assembly bolts 15.

Figure 5:
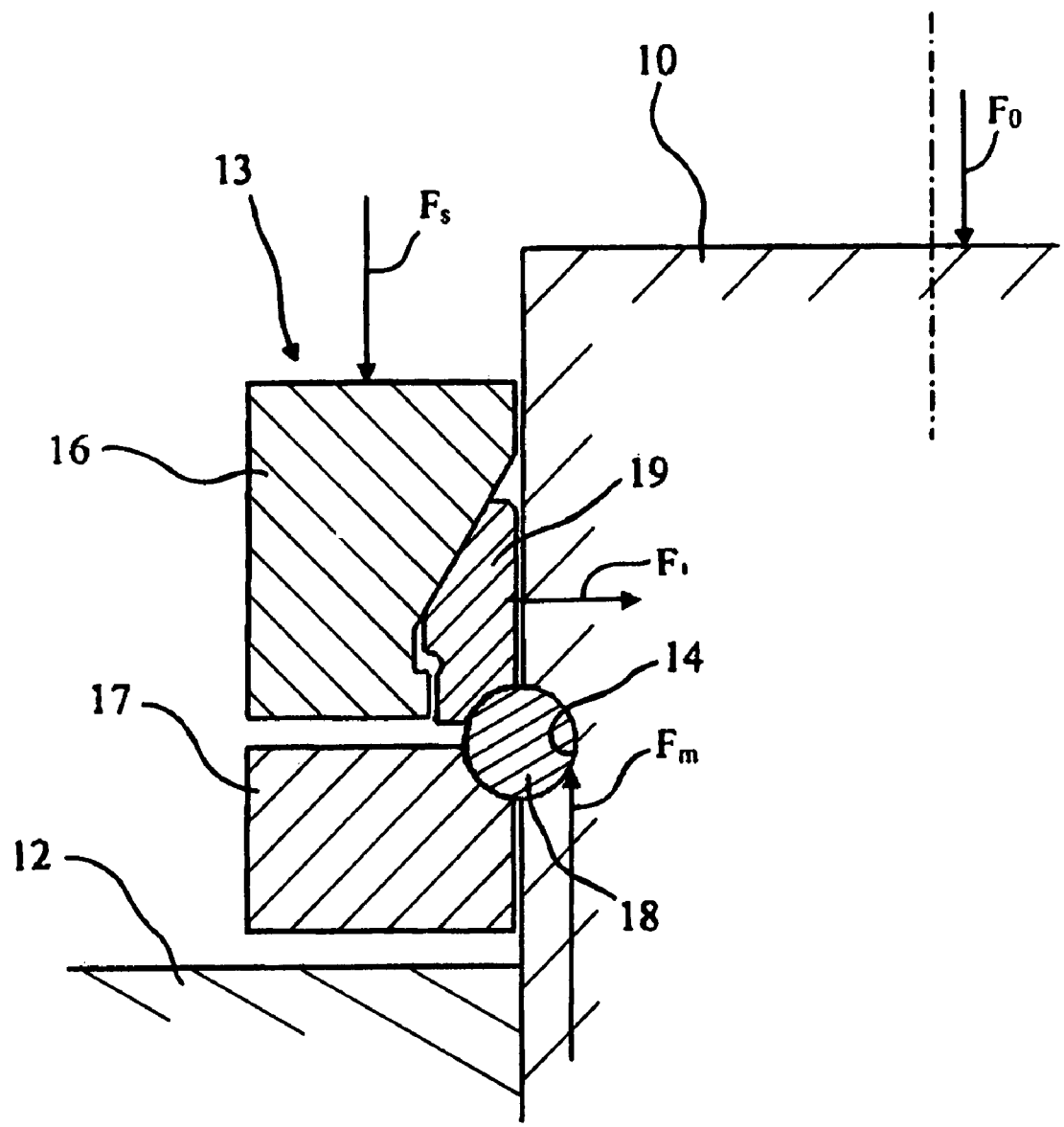
FIG. 5 shows the forces acting on the device according to the invention.

FIG. 5 shows the forces acting on the flanged connection, where $F_0$ is the force of the gas-filled spring, which occurs when the gas-filled spring 10 is compressed. The mass moment of inertia $F_m$ of the piston rod is received on the return travel of the gas-filled spring. When the two flange halves 16, 17 are pressed against one another by tightening of the assembly bolts 15 when fitting in the machine tool 12, the wedge-shaped part of the upper flange half 16 acts against the wedge-shaped part of the fixing element 19, a radially directed force $F_1$ being generated by the fixing element 19 acting against the tubular body of the gas-filled spring 10 due to the radial contraction of the fixing element 19. In fitting, an axially directed contact force (not shown) is also generated, which acts from the fixing element 19 against the locking ring 18. In other words a contact in the form of a frictional force is established between the fixing element 19, the locking ring 18 and the body of the gas-filled spring 10. Applying a predefined tensioning force $F_s$ and predefined tightening torque to the assembly bolts 15, generates the desired radial clamping force $F_1$ acting on the tubular body of the gas-filled spring 10. The greater the tightening torque the greater the clamping force or contract force between fixing element 19, gas-filled spring 10 and locking ring 18. Thus the flanged connection 13 copes with the reaction forces and load cycles that occur when the gas-filled spring 10 is compressed, since the connection is seated securely fixed to the gas-filled spring 10. The clamping force $F_1$ also prevents rotation of the gas-filled spring 10.

In the preferred embodiment of the present invention the fixing element 19 is arranged in the upper half of the flanged connection 13. It is naturally also possible to arrange fixing elements in the lower half of the flanged connection or even in both halves. Furthermore, the invention is not limited to the preferred embodiment described above. The person skilled in the art will appreciate, for example, that the locking ring and the fixing element can equally well be designed in one piece as an integrated unit whilst still obtaining the clamping force around the gas-filled spring. The locking ring and the fixing element can consequently be produced in anything from an integrated unit to four or more separate parts, with all possible combinations in between.

In the preferred embodiment of the flanged connection it is used for fixing a gas-filled spring in a machine tool, in particular a pressing tool, but the working principle of the gas-filled spring is also suited to other applications and other types of gas-filled springs with the same scope for fixing. The invention also allows the gas-filled spring to be fitted upside down with the piston rod directed downwards.

The invention claimed is:

1. A flanged connection designed to connect a gas-filled spring in a machine tool, said flanged connection comprising an upper flange half, a lower flange half, an annular fixing element, and a locking ring, said upper flange half and said lower flange half each including a through-opening designed axially to receive at least a portion of the gas-filled spring, said upper flange half and said lower flange half designed to be secured together such that the through-opening in said upper flange half is axially aligned with the through-opening in said lower flange half and said fixing element is clamped between said flange halves, said upper flange half and said lower flange half applying a clamping force to said fixing element and said locking ring to designed to engage the gas-filled spring when said upper flange half and said lower flange half are secured together, said locking ring engaging an annular recess along an inside surface of said fixing element and an annular recess along the through-opening of said lower flange half when said upper flange half and said lower flange half are secured together, said locking ring designed to engage a complementary groove around the gas-filled spring to secure the gas-filled spring in said flanged connection while being fixed in position between said fixing element half and said lower flange half when said upper flange half and said lower flange half are secured together, said fixing element movably engaging with said upper flange half when said upper flange half and said lower flange half are secured together, said fixing element applying a radially inward clamping force on said locking ring that is positioned at least partially around the gas-filled spring when said upper flange half and said lower flange half are secured together, said locking ring and said fixing element being at least two separate components, said fixing element applying a contact force against said locking ring when said upper flange half and said lower flange half are secured together the through-opening of said upper flange half having an inside surface having an inclined section in relation to a central axis of said flanged connection, said fixing element including an inclined section on an outside surface of said fixing element, said inclined sections of said flange section and said fixing element axially sliding along one another to cause said fixing element to move radially toward the gas-filled spring thereby causing said locking ring to also move radially toward the gas-filled spring and to increase said clamping force on the gas-filled spring.

2. The flanged connection according to claim 1, wherein said fixing element is spaced from said lower flange half after said flange halves are secured together and securing the gas-filled spring to said flange connection.

3. The flanged connection according to claim 2, wherein said fixing element has a groove running along said outside surface and designed to engage a projecting part on said inside surface of said upper flange half, said groove designed to engage said projecting part and to limit movement of said fixing element relative to said upper flange half.

4. The flanged connection according to claim 1, wherein said upper flange half and said lower flange half are connected together by a plurality of fasteners, said plurality of fasteners designed to draw together said flange halves and cause said fixing element to move said locking ring toward the gas-filled spring, thereby generating said clamping force between said fixing element and the gas-filled spring and generating a contact force between said fixing element and said locking ring.

5. The flanged connection according to claim 1, wherein the clamping force is designed to prevent rotation of the gas-filled spring.

6. A flanged connection designed to connect a gas-filled spring having a circular outer body to a machine tool, said flanged connection comprising an upper flange half, a lower flange half, an annular fixing element, and a locking ring, said upper flange half and said lower flange half each include a through-opening designed to axially receive at least a portion of the body of the gas-filled spring, said upper flange half and said lower flange half designed to be secured together, such that the through-opening in said upper flange half is axially aligned with the through-opening in said lower flange half and said fixing element is clamped between said flange halves, said upper flange half and said lower flange half applying a claming force to said fixing element and said locking ring to engage the gas-filled spring when said upper flange half and said lower flange half are secured together, said locking ring engaging an annular recess along an inside surface of said fixing element and an annular recess along the through-opening of said lower flange half when said upper flange half and said lower flange half are secured together, said locking ring designed to engage a complementary groove on the body of the gas-filled spring to secure the gas-filled spring in said flanged connection while being fixed in position between said fixing element and said lower flange half said upper flange includes an inclined section on an inside surface that faces the body of the gas-filled spring, said inclined section inclined in relation to a central axis of said flanged connection, said fixing element including an inclined section on an outside surface of said fixing element, said inclined surface of said fixing element axially sliding along said inclined section of said upper flange half to apply a radially inward clamping force on said fixing element and said locking ring that is positioned in the groove on the body of the gas-filled spring when said upper flange half and said lower flange half are secured together, said fixing element designed to move radially toward the gas-filled spring and to cause said clamping ring to move radially toward the gas-filled spring thereby causing said locking ring to increase said clamping force on the gas-filled spring when said upper flange half and said lower flange half are secured together, said clamping force designed to at least partially secure the gas-filled spring to said flanged connection and to inhibit movement of the gas-filled spring in said flanged connection, said locking ring has a generally circular cross-sectional shape prior to being secured between said flange halves, said locking ring and said fixing element are at least two separate components.

7. The flanged connection as defined in claim 6, wherein said through-opening in at least one of said flange halves is circular.

8. The flanged connection as defined in 6, wherein said flange halves are connected to by at least one fastener.

9. The flanged connection as defined in 6, wherein said fixing element only engages said upper flange half when said upper flange half and said lower flange half are secured together.

10. The flanged connection as defined in claim 6, wherein said fixing element is designed to move toward said locking ring and apply said clamping force on said locking ring when said upper flange half and said lower flange half are secured together.

11. The flanged connection as defined in claim 6, wherein said flanged connection includes only one fixing element and only one locking ring.

12. The flanged connection as defined in claim 6, wherein said upper flange half includes a projecting part on said inside surface, said fixing element including a groove running along said outside surface, said groove designed to engage said projecting part and limit movement of said fixing element relative to said upper flange half.

13. The flanged connection as defined in claim 6, wherein said fixing element and said locking ring each including spaced ends to enable a diameter of said fixing element and said locking ring to reduce when said flange halves are secured together.

* * * * *